ated by the

UNITED STATES PATENT OFFICE.

FRED H. McGREGORY, OF DECATUR, ILLINOIS.

DUSTLESS DUSTER.

1,344,545.  Specification of Letters Patent.  Patented June 22, 1920.

No Drawing.  Application filed January 17, 1916. Serial No. 72,593.

*To all whom it may concern:*

Be it known that I, FRED H. McGREGORY, a citizen of the United States, residing at Decatur, in the county of Macon and State of Illinois, have invented new and useful Improvements in Dustless Dusters, of which the following is a specification.

The present invention relates to dustless dusters, particularly such as are suitable for wiping automobiles and the like for the removal of dust therefrom, without stirring up any considerable amount of dust in the atmosphere surrounding the automobile, and without leaving a surface which will attract dust from the atmosphere.

It has been previously proposed, to make dustless dusters, by impregnating fabrics with a solution of paraffin wax, or similar material, in a readily volatile solvent, and thereafter, by the evaporation of the solvent, to leave a very light impregnation of the paraffin or similar material in the fabric.

The present invention relates to an improvement of this kind, the particular elements of novelty being described below.

In producing my dustless duster, I preferably employ cotton waste as the starting material, in place of fabric, such as has previously been employed, although for some purposes fabrics are very suitable. I prefer, however, to first make a flattened ball of cotton waste, of a very fine grade of white soft waste, not the ordinary coarse cotton waste, and thereafter run several rows of stitching across the said flattened ball, stitching in the form of a double cross (#) being suitable. The cotton waste is then very lightly impregnated with the following mixture:

| | |
|---|---|
| Terpineol | 3 ounces. |
| Paraffin oil | 4 gallons. |
| Hydrocarbon oil of 31° Bé. flashing at 450° with a viscosity of about 220 (measured by the Saybolt viscosimeter) | 1 gallon. |
| Oil of citronella | 2 ounces. |
| "Benzol" | 1 gallon. |

For the step of impregnation the duster may be held in a spray of the solution until it absorbs a certain amount. It should not be allowed to absorb too much, since if too much of the composition is absorbed by the duster, a greasy or oily surface will be produced by the use of the duster, which will gather dust. The amount absorbed should not be sufficient to enable any to be squeezed out, by wringing the same with the hands.

The paraffin oil which I preferably employ is an oil having a gravity of 25° Bé., flash point 340, viscosity 110 (measured by the Saybolt viscosimeter). The so-called "benzol" is a mixture of hydrocarbons of the benzene series, obtained in refining coal tar, and in purifying coal gas, and is preferably that known as "90% benzol," which contains about 70% of benzene, 24% of toluene and 6% of xylene, small quantities of carbon disulfid, and other materials. The terpineol, is when in the pure form, a white crystalline substance, having the formula $C_{10}H_{16}H_2O$, melting at about 35° C., and occurring in certain volatile or essential oils, and formed by the action of dilute acids upon terpene hydrate. The commercial article, however, which I prefer to use, is a liquid at ordinary temperatures, owing to the admixture of certain other substances and has an odor resembling Lily of the Valley, and is extensively used in the manufacture of perfumes.

While I have described a particular composition for impregnating the cotton waste, it is obvious that the invention includes modifications and variances from the specific proportions stated.

What I claim is:—

A dustless duster comprising cotton waste, stitched to prevent raveling, lightly impregnated with a mixture having the following named ingredients, mixed in the proportions stated, viz: terpineol, 3 ounces; paraffin oil having a gravity of 25° Bé., a flash point of 340° and a viscosity of 110, 4 gallons; hydrocarbon oil having a gravity of 31° Bé., a flash point of 450 and a viscosity of 220, 1 gallon; oil of citronella 2 ounces and crude "benzol" containing about 70% benzene, 24% toluene and 6% xylene, 1 gallon.

In testimony whereof I affix my signature in presence of two witnesses.

FRED H. McGREGORY.

Witnesses:
JNO. C. ELLIS,
C. E. BOOTH.